United States Patent [19]

Malon et al.

[11] Patent Number: 4,468,502

[45] Date of Patent: Aug. 28, 1984

[54] CROSS-LINKED POLYPHENYLENE OXIDE

[75] Inventors: Raymond F. Malon, Edmundson; Anthony Zampini, St. Louis, both of Mo.

[73] Assignee: Monsanto Company, St. Louis, Mo.

[21] Appl. No.: 509,629

[22] Filed: Jun. 30, 1983

[51] Int. Cl.$^3$ .............................................. C08G 65/48
[52] U.S. Cl. ........................................ 525/390; 55/16; 55/158; 210/500.2
[58] Field of Search .............................. 525/390, 905

[56] References Cited

U.S. PATENT DOCUMENTS

| | | | |
|---|---|---|---|
| 3,262,892 | 7/1966 | Hay | 260/2.2 |
| 3,306,874 | 2/1967 | Hay | 260/47 |
| 3,306,875 | 2/1967 | Hay | 260/47 |
| 3,330,806 | 7/1967 | Borman | 260/47 |
| 3,334,069 | 8/1967 | Borman | 260/47 |
| 3,337,499 | 8/1967 | Bussink et al. | 260/47 |
| 3,375,298 | 3/1968 | Fox | 260/830 |
| 3,396,146 | 8/1968 | Schmukler | 260/47 |
| 3,406,147 | 10/1968 | Schmukler | 260/47 |
| 3,630,900 | 12/1971 | van der Voort | 525/390 |
| 3,729,433 | 4/1973 | Bilow | 525/390 |
| 3,780,496 | 12/1973 | Ward et al. | 55/16 |
| 3,875,114 | 4/1975 | Swiger | 525/390 |
| 4,230,463 | 10/1980 | Henis et al. | 59/14 |
| 4,321,331 | 3/1982 | Widiger, Jr. | 525/379 |

FOREIGN PATENT DOCUMENTS 31730 7/1979 European Pat. Off.

*Primary Examiner*—Christopher A. Henderson
*Attorney, Agent, or Firm*—Thomas E. Kelley; Henry Croskell

[57] ABSTRACT

Cross-linked polyphenylene oxides comprise the reaction product of alkyl halogenated phenylene oxide polymer and primary monoamines, such as methylamine, ethylamine, propylamine, butylamine and aniline. Such cross-linked polyphenylene oxide compositions are useful as membranes.

6 Claims, No Drawings

CROSS-LINKED POLYPHENYLENE OXIDE

BACKGROUND OF THE INVENTION

This invention relates to cross-linked polyphenylene oxide compositions. More particularly, it relates to such compositions where polyphenylene oxide chains are cross-linked with benzylamine bonding provided by reaction with a primary monoamine.

The polyphenylene oxides are a body of thermoplastics disclosed in U.S. Pat. Nos. 3,306,874 and 3,306,875, incorporated herein by reference. They are characterized by a unique combination of chemical, physical and electrical properties over a temperature range of more than 600° F., extending from a brittle point of minus 275° F. to a heat distortion temperature of 375° F. In particular, the polyphenylene oxides combine high tensile strength and tensile modulus with a high softening temperature, and excellent resistance to water, steam, strong acids and alkalies.

Some polyphenylene oxides also exhibit exceptional transport properties making them useful as membranes for separation processes such as ion exchange, ultra filtration, reverse osmosis, pervaporation and even gas permeation.

However, the polyphenylene oxides also have certain undesirable characteristics that are common to most thermoplastic materials. For example, their resistance to most common organic solvents is low. Aromatic and chlorinated hydrocarbon solvents dissolve phenylene oxide polymers, while other solvents and solvent vapors induce crazing in molded polyphenylene oxide parts under stress, causing loss of strength. The tensile properties of the resins decrease steadily with increasing temperature, and drop off sharply at about 200° C. Further, under extreme prolonged stresss, molded parts formed from the polyphenylene oxides tend to creep, causing permanent deformation.

It is known that these disadvantages which are common to most thermoplastic materials, may be overcome by cross-linking the individual polymer molecules during, or after, the forming of the material into its final shape. Thus, if a sufficient number of cross-linking sites are present, the material can be cross-linked and will then no longer be soluble, but only swell to a greater or lesser extent. Also, while the phenomenon of solvent crazing is not fully understood, it appears to involve crystallization of the polymer molecules. As the mobility of the polymer molecule is limited by cross-linking, crystallization is no longer possible, and thus the problem of solvent crazing is removed. The limitation on molecular mobility also prevents the polymer from flowing, even above its melting point, the preventing, to a large degree, creep and loss of tensile properties at increased temperature.

The polyphenylene oxides are, to a high degree, chemically inert, a desirable characteristic from a materials standpoint. However, because of this inertness the prior art has experienced difficulty in introducing cross-links between polymer chains, and structurally different units generally, by simple chemical processes. For example, prolonged heating in air will render the polymer insoluble in aromatic or chlorinated hydrocarbon solvents, but the degree of cross-linking accomplished is quite low, and the materials produced swell to a considerable degree.

Cross-linked polyphenylene oxides have been disclosed by Borman in U.S. Pat. No. 3,330,806 and by Schmukler in U.S. Pat. No. 3,406,147. Borman disclosed a cross-linkable polyphenylene oxide without the disadvantages of degradation and brittleness resulting from heat-induced cross-linking by introducing hydroxyl radicals into the polyphenylene oxide resin. The hydroxyl substituted polyphenylene oxide could then be cross-linked by reaction, for instance with a formaldehyde-releasing substance such as hexamethylenetetramine. Schmukler attempted to overcome deficiencies in cross-linked polyphenylene oxides by providing a plurality of side chain acyloxy groups on the polymer chain. Cross-linking could then be induced at elevated temperatures by aromatic substitution in the presence of a Lewis acid or by transesterification with a difunctional material reactive with the acyloxy group. A disadvantage of such cross-linked polyphenylene oxides as disclosed by Borman or Schmukler is that the cross-linked resin comprises by-products of the cross-linking reaction which are detrimental to the utility of such cross-linked resins for gas permeation purposes.

Ward et al. in U.S. Pat. No. 3,780,496 disclose sulfonated polyxylelene oxide membranes for use in gas separations where the hydrogen ion form of the sulfonate substituent can be converted to a metal counter ion form. Ward et al. disclose that such membranes have some utility in gas separation. A principal disadvantage is that the presence of water can be detrimental in membrane formation. Accordingly, the preparation of such membranes in a water-based coagulating system is impractical.

SUMMARY OF THE INVENTION

The present invention provides a cross-linked phenylene oxide polymer composition comprising the reaction product of an alkyl halogenated phenylene oxide polymer and a primary monoamine. Preferred monoamines include methylamine, ethylamine, n-propylamine, n-butylamine and aniline. Preferred cross-linked phenylene oxide polymer compositions include the reaction product of brominated poly(2,6-dimethyl-1,4-phenylene oxide) and a primary monoamine where there are from 0.01 to 2.0 benzylic bromine atoms per phenylene oxide unit. Such cross-linked phenylene oxide polymer compositions have cross-linkage between phenyl groups represented by the structural formula $-CH_2NRCH_2-$, where R is methyl, ethyl, propyl, butyl or phenyl.

DESCRIPTION OF THE PREFERRED EMBODIMENTS

This invention provides cross-linked phenylene oxide polymer compositions comprising the reaction product of an alkyl halogenated phenylene oxide polymer and a primary monoamine. The alkyl halogenated phenylene oxide polymer which is useful in such a cross-linked phenylene oxide polymer composition will generally have at least one alkyl group on each phenylene ring. The alkyl group can vary in size and may have from 1 to 3 carbon atoms or more. In most cases there will be two alkyl groups on each phenylene ring with both alkyl groups being in an ortho position with respect to the oxygen of the phenylene oxide. When there are more than one carbon atoms in the alkyl group attached to the phenylene ring the akly groups are preferably halogenated at the benzylic carbon atom which is that carbon atom of the alkyl group which is attached to the phenylene ring. The preferred halogens are chlorine and bromine. The preferred alkyl group attached to the phenylene ring is the methyl group. The most preferred alkyl halogenated phenylene oxide polymer is a brominated polymer of 2,6-dimethyl-1,4-phenylene oxide.

In order for cross-linking reaction to occur between the alkyl halogenated phenylene oxide polymer and a primary monoamine it is not necessary that an active halogen atom be attached to each alkyl group of any polymer. In this regard it is often adequate for formation of the cross-linked phenylene oxide polymer composition that there be sufficient bromine atoms per phenylene oxide unit such that the cross-linking reaction can occur. In this regard haloalkyl substituted phenylene oxide polymer is useful in the cross-linking reaction when there are from 0.01 to 2.0 benzylic halogen atoms per phenylene oxide unit. Cross-linking reactions also readily occur when there are more than 2.0 benzylic halogen atoms per phenylene oxide unit. Preferably the alkyl halogenated phenylene oxide polymer will comprise from 0.01 to 2.0 benzylic bromine atoms per phenylene oxide unit of poly(2,6-dimethyl-1,4-phenylene oxide). More preferably there will be from about 0.2 to about 1.2 benzylic bromine atoms per phenylene oxide unit.

The primary monoamines which are useful in forming the compound of this invention are non-sterically hindered such that they readily react in the cross-linking reaction. It is often desired that the primary monoamines have small hydrocarbon groups, such as lower alkyls having 6 or less carbon atoms or single aryl groups. Preferred monoamines having a lower alkyl group include methylamine, ethylamine, propylamines such as n-propylamine, and butylamines such as n-butylamine. A preferred monoamine having a single aryl group is aniline. Such monoamines may, of course, be substituted with non-reactive groups.

The cross-linked phenylene oxide polymer compositions of this invention will have cross-linkage between phenylene groups represented by the structural formula —CHR′NRCHR′—, where R is a lower alkyl group selected from the group consisting of methyl, ethyl, propyl such as n-propyl, butyl such as n-butyl or a single aryl group such as phenyl, and where R′ is hydrogen or a lower alkyl of less than 4 carbons. When the polymer composition of this invention is a cross-linked substituted polymer of 2,6-dimethyl-1,4-phenylene oxide the cross-linkage between phenylene groups is represented by the structural formula —CH$_2$NRCH$_2$—.

The cross-linked phenylene oxide polymer compositions of this invention are useful wherever it is desirable to utilize a polyphenylene oxide having resistance to organic solvents and improved physical properties. A preferred use for such cross-linked polyphenylene oxide polymer composition is as a membrane, for instance a selectively permeable gas separation membrane. Such membranes can be provided in either film or hollow fiber form.

FORMATION OF HALOGENATED POLYPHENYLENE OXIDE

A preferred method of forming the polyphenylene oxide precursor having halogenated alkyl groups substituents is to halogenated an alkylated polyphenylene oxide. Such alkylated polyphenylene oxides can comprise a poly(2,6-dialkyl-1,4-phenylene oxide), such as a poly(2,6-dimethyl-1,4-phenylene oxide). Halogenation of the alkyl group occurs generally at the benzylic carbon.

The halogenation can be effected by addition of a halogen to a solution of the polyphenylene oxide in a solvent, for instance a halogenated solvent, such as chlorobenzene. The preferred halogenating agents include chlorine, bromine, chlorine-producing compounds and bromine-producing compounds. The halogenating agent is added to the solution of polyphenylene oxide under conditions to control halogenation. Halogenation will tend to occur by free radical reaction at higher temperatures. Under such free radical reaction halogen will be added to the benzylic carbon. Halogenation tends to occur by electrophilic substituion at lower temperatures. Under such electrophilic substitution the halogen is added to the aromatic ring. For instance, in the bromination of a solution of poly(2,6-dimethyl-1,4-phenylene oxide) in chlorobenzene by the addition of bromine, electrophilic substitution predominates at lower temperatures, for instance temperatures lower than about 80° C., and free radical substitution predominates at higher temperatures, for instance under reflux conditions at temperatures of about 130° C. Halogenation by both free radical substitution and electrophilic substitution can occur at intermediate temperatures.

In some instances it may be desired to conduct halogenation under conditions under which free radical substitution predominates to produce a polyphenylene oxide precursor with halogen primarily on a benzylic carbon. In other instances it may be desirable to provide a polyphenylene oxide precursor with some halogen directly substituted onto the aromatic ring. Such halogen substituted onto the aromatic ring does not freely react in subsequent cross-linking operations but may provide desirable properties, for instance, for membrane gas separation.

The halogenated polyphenylene oxide precursor can be recovered by precipitation in a non-solvent, for instance such as methanol. Other recovery steps include filtration washing with such non-solvent and drying for instance at elevated temperatures and reduced pressures.

CROSSLINKING OF HALOGENATED POLYPHENYLENE OXIDE

The halogenated polyphenylene oxide can be cross-linked before or after forming the halogenated polyphenylene oxide into a useful form. In many cases it is desirable to crosslink the preformed article of the halogenated polyphenylene oxide. The cross linking reaction can be effected with a primary monoamine as the cross-linking agent. The primary monoamine can be utilized either in gaseous form such as gaseous methylamine or in a liquid form, for instance as a solution such as a primary monoamine. Such solutions can be aqueous solutions of a primary monoamine or organic solutions of a primary monoamine.

Cross-linking can be effected by any means of contacting the cross-linking agent with active halogen on the halogenated polyphenylene oxide membrane under conditions which do not deleteriously effect the preformed structure of the polymer. In the case of cross-linking with methylamine gas it is generally sufficient to expose the halogenated polyphenylene oxide membranes to the methylamine gas, for instance in a confined space. Exposure at mild conditions, for instance ambient temperature and atmospheric pressure, are often sufficient to effect adequate crosslinking. Cross-linking can be effected to a higher degree by employing more severe reaction conditions, for instance higher pressure and/or higher temperature.

In the case of cross-linking of halogenated polyphenylene oxide membranes with solutions of a primary monoamine, for instance aqueous solutions of n-propylamine, effective cross-linking can often be obtained by simply soaking the halogenated polyphenylene oxide membrane in the solution for a reasonable time. Of course more extensive cross-linking can be effected by utilizing more severe reaction conditions, for instance higher temperatures.

The invention is further illustrated by, but not limited to, the following examples.

EXAMPLE 1

This example demonstrates the use of bromine as the brominating agent for a polyarylene oxide.

250 g of poly(2,6-dimethyl-2,4-phenylene oxide) having an intrinsic viscosity of 0.508 dl/g, as measured in chloroform at 25° C., was dissolved in 3,200 ml of chlorobenzene in a reactor consisting of a 5 liter 3-neck Morton flask equipped with a mechanical stirrer, addition funnel and a condenser having an acid water trap. The solution was heated via oil bath to boiling and dried by removing 200 ml of distillate. To the boiling solution, 250 g of bromine was added over four hours. The solution was allowed to boil for an additional 30 minutes under a nitrogen sweep. After cooling, the solution was sprayed into 15 liters of methanol to precipitate the halogenated polymer. The halogenated polymer was collected on a filter, washed with methanol and dried at 50° C. under reduced pressure. The yield was 339.5 grams (90 percent of theoretical). The halogenated polymer had a total bromine content of 31.4 percent by weight. Calculations from the integral curve of the proton magnetic resonance spectra of the halogenated polymer showed that bromine was substituted at benzylic carbons at a level of 0.6 bromine per phenylene oxide unit and that bromine was substituted into the aromatic ring at the level of 0.08 bromine per phenylene oxide unit.

EXAMPLE 2

This example demonstrates the use of N-bromosuccinimide as the brominating agent.

11.4 g of poly(2,6-dimethyl-1, 4-phenylene oxide), having an intrinsic viscosity of 0.50 dl/g, as measured in chloroform at 25° C., was dissolved in 410 ml of chlorobenzene in a 500 ml 3-neck round bottom flask equipped with a mechanical stirrer, condenser having an acid water trap and a nitrogen inlet tube. Using an oil bath, the polymer solution was heated to 115° C. 16.9 of N-bromosuccinimide were added. While under nitrogen, the reaction mixture was allowed to boil until bromine was no longer observed in the vapor phase over the reaction medium. After cooling to ambient temperature, the reaction mixture was filtered and the product precipitated in methanol. The halogenated polymer was collected, washed with methanol and air dried on the filter. The halogenated polymer was dissolved in 120 ml chloroform and reprecipitated in methanol. Finally, the halogenated polymer was dried four days at 50° C. in a vacuum oven. The yield was 12.0 g (63 percent theoretical). The total bromine content of the halogenated polymer was 36.8 percent by weight. Calculations based on the integral curve of the nuclear magnetic resonance spectra showed that the halogenated polymer was substituted with bromine at the benzylic carbon at a level of 0.65 bromine per phenylene oxide unit and substituted with bromine at the aromatic ring at a level of 0.22 bromine per phenylene oxide unit.

EXAMPLE 3

This example demonstrates a general procedure for introducing bromine at both the aryl and benzylic position of PPO a polyarylene oxide.

30 g of poly(2,6-dimethyl-1,4-phenylene oxide) having an intrinsic viscosity of 0.508 dl/g, as measured in chloroform at 25° C., was dissolved in 450 ml of chlorobenzene in a reactor consisting of a 1000 ml 3-neck round bottom flask equipped with an addition funnel, a mechanical stirrer and a condenser having an acid water trap and a thermometer. Bromine was substituted into the polymer principally at the aromatic ring (aryl bromination) by adding 42 g of bromine over 15 minutes while the solution was maintained at 66-72° C. The aryl brominated polymer solution was heated to reflux, at a temperature of about 130° C. Under reflux, a condition favorable to benzylic bromination, 22 g of bromine was added over 30 minutes. After reflux for 10 minutes, about 20 percent of the solvent was distilled from the reaction solution. The solution was cooled and the halogenated polymer precipitated in methanol. The halogenated polymer was washed with methanol and dried at 55° C. for five days in a vacuum oven. The yield was 61.5 g (99 percent of theoretical). The halogenated polymer had a total bromine content of 49.3 percent by weight. Calculations based on nuclear magnetic resonance analysis showed that the halogenated polymer was substituted with bromine at benzylic carbon at a level of 0.88 bromine per phenylene oxide unit and substituted with bromine in the aromatic ring at a level of 0.56 bromine per phenylene oxide unit. That is, the benzylic halogen level was 0.88 and the aryl halogen level was 0.56.

EXAMPLE 4

This example demonstrates an alternate method of preparing an aryl-benzylic brominated polyarylene oxide as well as the importance of reaction temperature on bromine distribution in the product.

In this example, 30 g of poly(2,6-dimethyl-1,4-phenylene oxide) having a weight average molecular weight, Mw, of 49,000 was dissolved in 450 ml chlorobenzene in a reactor consisting of a 1000 ml 3-neck round bottom flask equipped as in Example 3. The solution was heated to 115° C. 40 g of bromine was added over 20 minutes. The solution was kept at 115° C. for an additional 30 minutes, then cooled to room temperature. The halogenated polymer was precipitated in methanol, washed with methanol and dried at 50° C. in a vacuum oven. The yield was 48.7 g (97.4 percent of theoretical). The halogenated polymer had total bromine content of 38.98 percent by weight. Nuclear magnetic resonance showed that the halogenated polymer had a benzylic halogen level of 0.38 and an aryl halogen level of 0.6.

EXAMPLES 5-10

These examples illustrate the flexibility in introducing bromine at various levels at the aryl and benzylic positions of a polyarylene oxide.

Aryl brominated poly(2,6-dimethyl-1,4-phenylene oxide) was produced as in Example 3. Benzylic halogenation was also carried out as in Example 3 except that the amount of bromine added to the aryl brominated polymer solution at reflux was varied. The variations in benzylic halogenation are illustrated in Table I.

TABLE I

| Example | Grams of Br$_2$ Added to Aryl Brominated Polymer Solution at Reflux | Yield (g) | Yield (% theoretical) | Bromine (Wt %) | Bromine Distribution/ Arylene Unit Aryl | Bromine Distribution/ Arylene Unit Benzylic |
|---|---|---|---|---|---|---|
| 5 | 4.0 | 53 | 100 | 42.6 | 0.92 | 0.19 |
| 6 | 10.0 | 54 | 96 | 44.7 | 0.90 | 0.30 |
| 7 | 16.0 | 56 | 95 | 46.7 | 0.89 | 0.41 |
| 8 | 34.0 | 67 | 99 | 52.9 | 0.91 | 0.75 |
| 9 | 42.0 | 72 | 100 | 55.4 | 0.90 | 0.94 |
| 10 | 54.5 | 77 | 98 | 58.3 | 0.89 | 1.18 |

EXAMPLE 11

This example illustrates a procedure for forming hollow fiber membranes of brominated polyarylene oxide.

Brominated polyarylene oxide was prepared from poly(2,6-dimethyl-1,4-phenylene oxide). The brominated polyarylene oxide had a bromine content of 31.1 percent by weight and had a benzylic bromine level of 0.58 and an aryl bromine level of 0.10. The brominated polymer had a weight average molecular weight of about 86,000 and a number average molecular weight of about 43,000. A spinning solution was prepared and consisted of about 37 percent by weight of the brominated polymer and 63 percent by weight of a liquid carrier consisting of 95 percent by weight of N-formylpiperidine, 2 percent by weight acetic acid and 3 percent by weight acetic anhydride. The spinning solution was prepared by mixing for four hours to completely dissolve the brominated polymer. The brominated polymer solution was allowed to deaerate at room temperature for about 18 hours.

The deaerated brominated polymer solution was heated to about 46°–48° C. and pumped to a tube-in-orifice-type spinnerette having an orifice diameter of 508 microns, an injection tube outside diameter of 229 microns and an injection tube inside diameter of 152 microns. The spinnerette was maintained at a temperature of approximately 47° C. by the use of an external electrical heating jacket. Deionized water at ambient temperatures was fed to the injection tube at a rate sufficient to maintain the hollow fiber shape, about 1.7 milliliters per minute. The nascent hollow fiber was extruded at a rate of about 36.6 meters per minute through an air gap of about 10.2 centimeters into a coagulation bath containing running tap water. The coagulation bath was maintained at a temperature of about 9° C. The nascent hollow fiber passed vertically downward into the coagulation bath for a distance of about 17 centimeters, around a roller to a slightly upwardly slanted path through the coagulation bath and then exited from the coagulation bath. The distance of immersion in the coagulation bath was about 1 meter.

The hollow fiber from the coagulation bath was then washed with running tap water in three sequential baths having Godet rolls. In each bath, the hollow fiber was immersed for a distance of about 10 to 13 meters. The first bath was maintained at a temperature of about 8° C., while the second and third baths were at 26° C. The wet hollow fiber had an outside diameter of about 680 microns and an inner diameter of about 280 microns.

The hollow fiber, while being maintained wet with water, was wound on a bobbin using a Leesona winder. The bobbin was stored in a vessel containing running tap water for about 24 hours and then stored in tap water at about ambient temperature for about 4 to 5 days. The hollow fiber, while being maintained wet, was wound on a skeiner to form hanks of hollow fibers.

The hanks of hollow fiber were hung vertically and are allowed to air dry at ambient temperature for about five days. The dried hollow fiber had an outside diameter of about 620 microns and an inner diameter of about 255 microns.

A test bundle of 6 to 8 hollow fiber membranes each of about 12 centimeters in length, was prepared. At one end, the test bundle was embedded in epoxy to form a cylindrical tube sheet through which the bores of the hollow fibers communicate. The other end was plugged with epoxy.

EXAMPLE 12

This example illustrates a procedure for preparing a cross-linked phenylene oxide polymer composition comprising the reaction product of a benzyl brominated poly(2,6-dimethyl-1,4-phenylene oxide) and methylamine. The cross-linked composition was prepared from a preformed hollow fiber membrane of the benzyl brominated phenylene oxide polymer.

A test bundle of hollow fiber membranes prepared in Example 11 was immersed for seven days in a 10 percent by volume aqueous solution of methylamine at 23° C. The bundle was soaked for 24 hours in deionized water at 80° C. to remove excess methylamine. The bundle was dried for 22 hours at 80° C. The bundle of hollow fiber membranes was analyzed for permeation properties.

The utility of the methylamine cross-linked benzyl-brominated poly(2,6-dimethyl-1,4-phenylene oxide) as a gas separation membrane was shown by determination of gas permeabilities and separation factors. These permeation properties were determined using gas mixtures in an elongated cylindrical chamber of about 150 cc. The gas mixtures were fed to the chamber to contact the outer surface of the hollow fiber membranes at pressures in a range of 10 to 100 psig. The gas mixtures passed through the chamber at a flow rate in the range of one to six liters per minute. The bores of the hollow fibers were under vacuum for about 5 to 10 minutes until the permeation reached equilibrium. Permeabilities were determined by allowing permeate gas to expand into a calibrated volume over a period of time. The permeate gas samples were then subjected to analysis. The permeability, (P/l), is expressed in units of GPU which is $10^{-6} cm^3(STP)/cm^2\text{-}sec\text{-}cmHg$. The hollow fibers exhibited a permeability for hydrogen, $(P/l)H_2$, of 125 GPU and a separation factor of hydrogen over methane, $\alpha_{CH_4}{}^{H_2}$, of 5.8

EXAMPLE 13

This example illustrates a procedure for preparing a cross-linked phenylene oxide polymer composition comprising the reaction product of a benzyl brominated poly(2,6-dimethyl-1,4-phenylene oxide) and n-butylamine. The cross-linked composition was prepared from a preformed hollow fiber membrane of the benzyl brominated phenylene oxide polymer.

The hollow fiber membranes prepared in Example 11 were soaked for 33½ hours in an aqueous solution of 5 percent by volume n-butylamine. The solution was maintained at 80° C. The fibers were soaked in water at 80° C. for 38 hours to remove excess amine. The fibers were dried for 23 hours at 80° C. The cross-linked polymer was not soluble in solvents for the precursor brominated phenylene oxide polymer.

The hollow fiber membranes of the cross-linked polymer were analyzed for permeation properties as in Example 12. The membranes exhibited a permeability for hydrogen, $(P/l)H_2$, of 140 GPU and a separation factor for hydrogen over methane, $\alpha_{CH_4}^{H_2}$, of 21.

EXAMPLE 14

This example illustrates a procedure for preparing a cross-linked phenylene oxide polymer composition comprising the reaction product of a benzyl brominated poly(2,6-dimethyl-1,4-phenylene oxide) and aniline. The cross-linked composition was prepared from a preformed hollow fiber membrane of the benzyl brominated phenylene oxide polymer.

The hollow fiber membranes prepared in Example 11 was 33½ hours in a solution of 5 percent by volume aniline in an aqueous mixture of 20 percent by volume methanol. The solution was maintained at 80° C. The fibers were soaked in an aqueous solution of 20 percent by volume methanol for 38 hours to remove excess aniline. The fibers were dried at 80° C. for 23 hours. The cross-linked polymer was not soluble in solvents for the precursor brominated phenylene oxide polymer.

The hollow fiber membranes of the cross-linked polymer were analyzed for permeation properties as in Example 12. The membranes exhibited a permeability for hydrogen, $(P/l)H_2$, of 41 GPU and a separation factor for hydrogen over methane, of $\alpha_{CH_4}^{H_2}$, of 50.

The foregoing description of embodiments of this invention is not intended to be a limitation to the scope of this invention. As will be apparent to those skilled in the art, many variations and modifications can be made to the compositions of this invention as described in the above embodiments without departing from the spirit and scope of this invention.

We claim:

1. A cross-linked phenylene oxide polymer composition comprising the reaction product of an alkyl halogenated phenylene oxide polymer and a primary monoamine selected from the group consisting of methylamine, ethylamine, a propylamine, a butylamine and aniline, wherein cross-linkage between phenylene groups is represented by the structural formula —CH$_2$NRCH$_2$—, where R is methyl, ethyl, a propyl, a butyl or phenyl.

2. The composition of claim 1 wherein the phenylene oxide polymer has at least one alkyl group having 1 to 3 carbon atoms, said alkyl groups being in an ortho position on the phenylene ring with respect to the oxygen of the phenylene oxide.

3. The composition of claim 2 wherein said at least one alkyl group is halogenated at the benzylic carbon atom.

4. The composition of claim 3 wherein the phenylene oxide has two methyl groups.

5. The composition of claim 4 wherein the methyl groups are halogenated with chlorine or bromine.

6. A cross-linked phenylene oxide polymer composition comprising the reaction product of brominated poly(2,6-dimethyl-1,4-phenylene oxide) and a primary monoamine selected from the group consisting of methylamine, ethylamine, a propylamine, a butylamine and aniline wherein there are from 0.1 to 2.0 benzylic bromine atoms per phenylene oxide unit, wherein there is benzyl amine cross-linkage between phenylene groups represented by the structural formula —CH$_2$NRCH$_2$—, where R is methyl, ethyl, a propyl, a butyl or phenyl.

* * * * *